(12) United States Patent
Chang et al.

(10) Patent No.: US 7,342,083 B2
(45) Date of Patent: Mar. 11, 2008

(54) POLYAMINE POLYMERS

(75) Inventors: Han Ting Chang, Livermore, CA (US); Dominique Charmot, Campbell, CA (US); Samir Zard, Gif sur Yvette (FR)

(73) Assignee: Ilypsa, Inc., Newbury Park, CA (US)

( * ) Notice: Subject to any disclaimer, the term of this patent is extended or adjusted under 35 U.S.C. 154(b) by 339 days.

(21) Appl. No.: 10/980,935

(22) Filed: Nov. 3, 2004

(65) Prior Publication Data

US 2005/0165190 A1 Jul. 28, 2005

Related U.S. Application Data

(63) Continuation-in-part of application No. 10/701,385, filed on Nov. 3, 2003.

(51) Int. Cl.
*C08F 12/28* (2006.01)
(52) U.S. Cl. ...................... 526/310; 526/270
(58) Field of Classification Search ............... 526/270, 526/310
See application file for complete search history.

(56) References Cited

U.S. PATENT DOCUMENTS

| | | | |
|---|---|---|---|
| 3,308,020 A | 3/1967 | Wolf et al. |
| 3,499,960 A | 3/1970 | Macek et al. |
| 3,692,895 A | 9/1972 | Nelson et al. |
| 3,930,810 A | 1/1976 | Gattuso |
| 3,974,272 A | 8/1976 | Polli et al. |
| 4,015,939 A | 4/1977 | Lewin et al. |
| 4,027,009 A | 5/1977 | Grier et al. |
| 4,075,177 A | 2/1978 | Bonnet et al. |
| 4,135,880 A | 1/1979 | Mangiardi et al. |
| 4,410,688 A | 10/1983 | Denkewalter et al. |
| 4,507,466 A | 3/1985 | Tomalia et al. |
| 4,558,120 A | 12/1985 | Tomalia et al. |
| 4,568,737 A | 2/1986 | Tomalia et al. |
| 4,587,329 A | 5/1986 | Tomalia et al. |
| 4,599,400 A | 7/1986 | Tomalia et al. |
| 4,605,701 A | 8/1986 | Harada et al. |
| 4,631,337 A | 12/1986 | Tomalia et al. |
| 4,690,985 A | 9/1987 | Tomalia et al. |
| 4,734,200 A | 3/1988 | Berry |
| 4,737,550 A | 4/1988 | Tomalia |
| 4,747,881 A | 5/1988 | Shaw et al. |
| 4,902,501 A | 2/1990 | Bandi et al. |
| 5,091,175 A | 2/1992 | Imondi et al. |
| 5,254,669 A | 10/1993 | Blackborow |
| 5,338,532 A | 8/1994 | Tomalia et al. |
| 5,380,522 A | 1/1995 | Day |
| 5,447,726 A | 9/1995 | Nomura |
| 5,451,397 A | 9/1995 | Albright et al. |
| 5,487,888 A | 1/1996 | Mandeville, III et al. |
| 5,496,545 A | 3/1996 | Holmes-Farley et al. |
| 5,530,092 A | 6/1996 | Meijer et al. |
| 5,607,669 A | 3/1997 | Mandeville, III et al. |
| 5,618,530 A | 4/1997 | Mandeville, III et al. |
| 5,667,775 A | 9/1997 | Holmes-Farley et al. |
| 5,679,717 A | 10/1997 | Mandeville, III et al. |
| 5,693,675 A | 12/1997 | Mandeville, III et al. |
| 5,698,662 A | 12/1997 | Stoelwinder et al. |
| 5,702,696 A | 12/1997 | Mandeville, III et al. |
| 5,968,499 A | 10/1999 | Hider et al. |
| 5,980,881 A | 11/1999 | Mitsuka et al. |
| 5,985,938 A | 11/1999 | Holmes-Farley et al. |
| 6,007,803 A | 12/1999 | Mandeville, III et al. |
| 6,034,129 A | 3/2000 | Mandeville, III et al. |
| 6,060,604 A | 5/2000 | Yang et al. |
| 6,129,910 A | 10/2000 | Holmes-Farley et al. |
| 6,132,706 A | 10/2000 | Hider et al. |
| 6,180,094 B1 | 1/2001 | Sasaki et al. |
| 6,180,754 B1 | 1/2001 | Stutts et al. |
| 6,281,252 B1 | 8/2001 | Holmes-Farley et al. |
| 6,333,051 B1 | 12/2001 | Kabanov et al. |
| 6,361,768 B1 | 3/2002 | Galleguillos et al. |
| 6,362,266 B1 | 3/2002 | Buchholz et al. |
| 6,383,518 B1 | 5/2002 | Matsuda et al. |
| 6,423,754 B1 | 7/2002 | Holmes-Farley et al. |
| 6,471,968 B1 | 10/2002 | Baker, Jr. et al. |
| 6,475,510 B1 | 11/2002 | Venkatesh et al. |
| 6,509,013 B1 | 1/2003 | Holmes-Farley et al. |

(Continued)

FOREIGN PATENT DOCUMENTS

| | | |
|---|---|---|
| DE | 10305807 A1 | 8/2004 |
| EP | 0575596 B1 | 12/1993 |
| EP | 0373852 B1 | 10/1994 |
| EP | 0672703 A1 | 9/1995 |
| EP | 0707611 B1 | 4/1996 |

(Continued)

OTHER PUBLICATIONS

Brezina, B. et al., "Acid loading during treatment with sevelamer hydrochloride: mechanisms and clinical implications". *Kidney International*, (2004), 66:S39-S45.

Chertow, G.M. et al. "Long-term effects of sevelamer hydorchloride on the calcium x phosphate product nad lipid profile of haemodialysis patients", *Nephrology Dialysis Transplantation*, (1994), 14:2907-2914.

(Continued)

*Primary Examiner*—Robert D. Harlan
(74) *Attorney, Agent, or Firm*—Senniger Powers

(57) ABSTRACT

The present invention provides polymeric and pharmaceutical compositions comprising a polymer that contains vicinal amine moieties, referred to as polyvicinalamine polymers. The polyvicinalamines can be copolymers or homopolymers. Methods of use of the polymeric and pharmaceutical compositions for therapeutic and/or prophylactic benefits are disclosed herein. Examples of these methods include the treatment of renal diseases, hyperphosphatemia, and the removal of bile acids, oxalates and iron from the gastrointestinal tract.

17 Claims, No Drawings

U.S. PATENT DOCUMENTS

| | | |
|---|---|---|
| 6,566,407 B2 | 5/2003 | Holmes-Farley et al. |
| 6,593,366 B2 | 7/2003 | Mandeville, III et al. |
| 6,646,083 B2 | 11/2003 | Hirano et al. |
| 6,696,087 B2 | 2/2004 | Matsuda et al. |
| 6,726,905 B1 | 4/2004 | Mandeville, III et al. |
| 6,733,780 B1 | 5/2004 | Tyler et al. |
| 6,767,549 B2 | 7/2004 | Mandeville, III et al. |
| 2002/0028887 A1 | 3/2002 | Hirano et al. |
| 2002/0034723 A1 | 3/2002 | Leinenbach et al. |
| 2002/0054903 A1 | 5/2002 | Tyler et al. |
| 2002/0064511 A1 | 5/2002 | Simon et al. |
| 2002/0146386 A1 | 10/2002 | Simon et al. |
| 2002/0168333 A1 | 11/2002 | Burke |
| 2002/0182168 A1 | 12/2002 | Holmes-Farley |
| 2002/0187120 A1 | 12/2002 | Holmes-Farley et al. |
| 2002/0187121 A1 | 12/2002 | Burke |
| 2003/0039627 A1 | 2/2003 | Homes-Farley et al. |
| 2003/0049226 A1 | 3/2003 | Burke et al. |
| 2003/0078366 A1 | 4/2003 | McDonnell et al. |
| 2003/0091530 A1 | 5/2003 | Goto et al. |
| 2003/0092782 A1 | 5/2003 | Goto et al. |
| 2004/0018169 A1 | 1/2004 | Holmes-Farley et al. |
| 2004/0059065 A1 | 3/2004 | Goto et al. |
| 2004/0120922 A1 | 6/2004 | Burke |
| 2004/0170600 A1 | 9/2004 | Simon et al. |
| 2004/0194334 A1 | 10/2004 | Rea |
| 2005/0096438 A1 | 5/2005 | Chang et al. |
| 2005/0131138 A1 | 6/2005 | Connor et al. |
| 2005/0147580 A1 | 7/2005 | Connor et al. |
| 2005/0209423 A1 | 9/2005 | Chang et al. |
| 2005/0239901 A1 | 10/2005 | Chang et al. |
| 2005/0276781 A1 | 12/2005 | Ross et al. |

FOREIGN PATENT DOCUMENTS

| | | | |
|---|---|---|---|
| EP | 0741756 | B1 | 11/1996 |
| EP | 0997148 | B1 | 5/2000 |
| EP | 0793960 | B1 | 8/2001 |
| EP | 1153940 | A1 | 11/2001 |
| EP | 1209146 | B1 | 5/2002 |
| EP | 1283046 | A1 | 2/2003 |
| EP | 1304104 | A2 | 4/2003 |
| JP | 1998059851 | A | 3/1998 |
| JP | 1998130154 | A | 5/1998 |
| JP | 2003155429 | | 5/2003 |
| WO | WO 82/00257 | | 2/1982 |
| WO | WO 93/14147 | A1 | 7/1993 |
| WO | 9419379 | A1 | 9/1994 |
| WO | WO 94/27619 | A1 | 12/1994 |
| WO | WO 95/02008 | A1 | 1/1995 |
| WO | WO 95/05184 | A1 | 2/1995 |
| WO | WO 95/19384 | A1 | 7/1995 |
| WO | WO 95/20619 | A1 | 8/1995 |
| WO | WO 97/23514 | A1 | 7/1997 |
| WO | WO 97/49736 | A2 | 12/1997 |
| WO | WO 98/17707 | A1 | 4/1998 |
| WO | WO 98/42355 | A1 | 10/1998 |
| WO | WO 99/14297 | A1 | 3/1999 |
| WO | WO 99/40990 | A1 | 8/1999 |
| WO | WO 01/28527 | A2 | 4/2001 |
| WO | WO 01/38423 | A1 | 5/2001 |
| WO | WO 02/32974 | A2 | 4/2002 |
| WO | WO 02/032974 | A3 | 4/2002 |
| WO | WO 02/077074 | A1 | 10/2002 |
| WO | WO 2004/037274 | A1 | 5/2004 |
| WO | WO 2005/065291 | A2 | 7/2005 |
| WO | WO 2006/040579 | A1 | 4/2006 |

OTHER PUBLICATIONS

Hagmaier, V. et al., "Test of efficacy of an oxalate-binding anion exchanger Colestid in healthy subjects for use in idiopathic calcium-oxalate urolithiasis". *Helveica Chirurgica Acta*, (Aug. 1981), 48(3-4):421-424.

Klapper, M. et al., "Poly(methylene amine): A Polymer with the Maximum Possible Number of Amino Groups on a Polymer Backbone", *Angew. Chem. Int. Ed.*, vol. 42 (2003), pp. 4687-4690.

Ross, E.A. et al., "Synthesis of molecularly imprinted polymers (MIPs) for phosphate binding". Published in the abstract list of Renal Week Conference (Sep. 20, 2004), ASN.

Slatopolsky, E.A. et al., "RenaGel®, a nonabsorbed calcium-and aluminum-free phosphate binder, lowers serum phosphorus and parathyroid hormone". *Kidney International*, (1999), 55:299-307.

Zimmer, A. et al., "Ligand Synthesis and Metal Complex Formation of 1,2,3-Triaminopropane", *Eur. J. Inorg. Chem.*, Jul. 1998, pp. 2079-2086.

Reiss, Guido J. et al. 2000. Protonation products of pentaaminopentane as novel building blocks for hydrogen-bonded networks. *Acta Crysta.* C56: 284-288.

Zimmer, Anja et al. 2001. Complex Formation of $Ni^{II}$, $Cu^{II}$, $Pd^{II}$, and $Co^{III}$ with 1,2,3,4-Tetraaminobutane. *Chem. Eur. J.* 7(4): 917-931.

Barsotti, G. et al. 1979. Anion-Exchange Resins for the Uremic Hyperphosphatemia. *Mineral and Electrolyte Metabolism.* 2(1): 206.

Buhleier, Egon et al. 1978. "Cascade"—and "Nonskid-Chain-like" Syntheses of Molecular Cavity Topologies. *Synthesis.* 1978(02):155-158.

Burke, Steven K. 2000. Renagel®: reducing serum phophorus in haemodialysis patients. *Hospital Medicine*.61(9): 622-627.

Burt, Helen M. et al. 1985-86. In Vitro Studies Using Ion Exchange Resins as Potential Phosphate Binders for Renal Failure Patients. *Uremia Investigation*.9(1): 35-44.

Burt, Helen. M. et al. 1986. Ion-Exchange Resins as Potential Phosphate-Binding Agents for Renal Failure Patients: Effect of the Physicochemical Properties of Resins on Phosphate and Bile Salt Binding. *Journal of Pharmaceutical Sciences.* 76(5): 379-383.

Cholestyramine. 1998. Cholestyramine for oral suspension. Copley Pharmaceutical, Inc. Canton, MA. (Package Insert).

Colestid®. 2003. Colestid® micronized colestipol hydrochloride tablets. Pharmacia & Upjohn Company, Kalamazoo, MI. (Package Insert).

Coli, L. et al. 1992. Phosphate Removal by Resin Hemoperfusion Efficacy and Biocompatibility of a New Exchange Resin. *Biomaterials, Artificial Cells, and Immobilization Biotechnology.* 20(5): 1153-1163.

De Simone, Renato et al. 1978. New Microporous Cholestyramine Analog for Treatment of Hypercholesterolemia. *Journal of Pharmaceutical Sciences.* 67(12): 1695-1698.

Grynpas, R. et al. 1986. Organic ion exchange resins as substitutes for aluminum hydroxide gels. *Life Support Systems*.4(Suppl. 2): 276-8.

Hagmaier, V. et al. 1981. Investigation of the efficacy of oxalate-binding anionic exchanger Colestid in healthy subjects for use in idiopathic calcium-oxalate-urolithiasis. *Helv. Chir.Acta.* 48(3/4): 421-424.

Hardy, P. et al. 1998. Inhibition of Gastric Secretion by Omeprazole and Efficiency of Calcium Carbonate on the Control of Hyperphosphatemia in Patients on Chronic Hemodialysis. *Artificial Organs.* 22(7): 569-573.

Honda, Yoshiteru et al. 2000. Studies on Adsorption Characteristics of Bile Acids and Methotrexate to a New Type of Anion-Exchange Resin, Colestimide. *Chem. Pharm. Bull.* 48(7): 978-981.

Hurst, P.E. et al. 1963. The Effect of Oral Anion Exchange Resins on FæCAL Anions. Comparison with Calcium Salts and Aluminum Hydroxide. *Clin. Sci.* 24: 187-200.

Konechnik, Thomas J. et al. 1989. In Vitro Adsorption of Bile Salts by Colestipol Hydrochloride. *Pharmaceutical Research.* 6(7): 619-623.

Kurihara, Satoshi et al. 2005. Effect of MCI-196 (colestilan) as a phophate binder on hyperphosphataemia in haemodialysis patients: a double-blind, placebo-controlled, short-term trial. *Nephrol Dial Tranplant.* 20(2): 424-430.

McGary, T.J. et al. 1984-85. Polycation as an Alternative Osmotic Agent and Phosphate Binder in Peritoneal Dialysis. *Uremia Investigation.* 8(2): 79-84.

Nolan, James P. et al. 1975. Endotoxin Binding by Charged and Uncharged Resins. *Proceedings of the Society for Experimental Biology and Medicine.* 149: 766-770.

Peppas, Nicholas A. et al. 1993. Dendrimers and Star Polymers for Pharmaceutical and Medical Applications. *Proceed. Intern. Symp. Control. Rel. Bioact. Mater.*20: 143-144.

Schneider, H. et al. 1984. Aluminum-free oral phosphate binder. *Dep. Nephrol. Hypertension.* 1(2): 76-9. (Abstract Only).

Sechet, A. et al. 1999. Inhibition de la secretion gastrique par l'omeprazole et efficacite du carbonate de calcium sur le controle de l'hyperphosphoremie des patients hemodialyses chroniques [Inhibition of gastric secretion by omeprazole and efficacy of calcium carbonate in the control of hyperphosphatemia in patients on maintenance hemodialysis]. *Nephrologie.* 20(4): 213-216. (Article in French with English Summary).

Shataeva L.K. et al. 1982. [Effect of FAF anionite swelling on its sorption properties]. *Prikl Biokhim Microbiol.* 18(1): 65-70. (in Russian w/ English abstract).

Swearingen, Ronald A. et al. 2002. Determination of the binding parameter constants of Renagel® capsules and tablets utilizing the Langmuir approximation at various pH by ion chromatography. *Journal of Pharmaceutical and Biomedical Analysis.* 29: 195-201.

WelChol® Tablets. Licensed from: GelTex Pharmaceuticals, Inc. (Package Insert).

Wrong, O.M. 1972. Aluminum Toxicity. *Lancet.* 2(7772): 334-5.

Wrong, O.M. 1973. Anion-Exchange Resins in Treatment of Uræmic Acidosis and Hyperphosphatæmia. *Lancet.* 1(7801):493.

Daniel, Marie-Christine, et al. 2003. Supramolecular H-Bonded Assemblies of Redox-Active Metallodendrimers and Positive and Unusual Dendritic Effects on the Recognition of H2PO4. *J. Am. Chem.. Soc.* 125(5): 1150-1151.

Kioussis, Dimitri R., et al. 2005. Characterization of anion diffusion in polymer hydrogels used for wastewater remediation. *Polymer.* 46: 9342-9347.

Kioussis, Dimitri R., et al. 2005. Characterization of network morphology in anion binding hydrogels used for wastewater remediation. *Polymer.* 46: 10167-10172.

Mazzeo, Jeffrey R., et al. 1999. A phosphate binding assay for sevelamer hydrochloride by ion chromatography. *J. Pharm. Biomed. Anal.* 19: 911-915.

Panova, T.V., et al. 2004. Interaction of Poly(propylenimine) Dendrimers with Polyanionic Hydrogels. *Faculty of Chemistry,* Moscow State University. 46(5): 783-798. (in Russian with English Abstract).

Tiitu, Mari, et al. 2005. Aminic epoxy resin hardeners as reactive solvents for conjugated polymers, polyaniline base/epoxy composites for anticorrosion coatings. *Polymer.* 46: 6855-6861.

Bilicki, C.V., et al., Effect of Anions on Adsorption of Bile Salts by Colestipol Hydrochloride, Pharmaceutical Researsch, 1989, pp. 794-797, vol. 6, No. 9, Plenum Publishing Corporation.

Bleyer, A.J. et al., A Comparison of the Calcium-Free Phosphate Binder Sevelamer Hydrochloride With Calcium Acetate in the Treatment of Hyperphosphatemia in Hemodialysis Patients, American Journal of Kidney Diseases, 1999, pp. 694-701, vol. 33, No. 4, National Kidney Foundation, Inc.

Covassin, L., et al., Synthesis of Spermidine and Norspermidine Dimers as High Affinity Polyamine Transport Inhibitors, Bioorganic & Medicinal Chemistry Letters, 1999, vol. 9, pp. 1709-1714, Elsevier Science Ltd.

Jansen, Bart A.J., et al., A Tetranuclear Platinum Compound Designed to Overcome Cisplatin Resistance, Eur. J. Inorg. Chem., 1999, pp. 1429-1433, WILEY-VCH Verlag GmbH, D-69451 Weinheim.

Malluche, H.H., et al., Management of hyperphosphataemia of chronic kidney disease: lessons from the past and future directions, Nephrol Dial Transplant, 2002, pp. 1170-1175, vol. 17, European Renal Association-European Dialysis and Transplant Association.

Rauter, H., et al., Selective Platination of Biologically Relevant Polyamines. Linear Coordinating Spermidine and Spermine as Amplifying Linkers in Dinuclear Platinum Complexes, Inorg. Chem., 1997, pp. 3919-3927, vol. 36, American Chemical Society.

Sugano, M., et al., A novel use of chitosan as a hypocholesterolemic agent in rats, The American Journal of Clinical Nutrition, 1980, pp. 787-793, vol. 33.

POLYAMINE POLYMERS

This application is a continuation in part of U.S. application Ser. No. 10/701,385, filed Nov. 3, 2003, the contents of which are incorporated herein by reference in their entirety.

BACKGROUND OF THE INVENTION

Polyamine materials have been widely used in many areas ranging from commodity industry applications to home-and-personal care and pharmaceutical uses largely due to their cationic and hydrogen bonding properties. The cationic and the hydrogen bonding characteristics are given by the amine functionality and are modulated by the amine content, which also dictates the charge density on the material. In many applications, higher amine content leads to higher efficacy.

To date, known polyamines with high amine content include polyvinyl amines and polyethyleneimines, which both possess one amine group for every two carbon units (amine/carbon ratio=½), and polyallylamines, which possesses one amine group for every three carbon units (amine/carbon ratio=⅓). Polyvinyl amine is usually made from free-radical polymerization of vinyl formamide followed by hydrolysis of the formamide groups. It is a linear polymer comprising a polyethylene backbone with pendant primary amines. Polyethyleneimines produced by ring-opening polymerization of aziridines results in a hyperbranched structure with a mixed carbon and nitrogen backbone containing a mixture of primary, secondary, and tertiary amines. Linear polyethyleneimine is produced by ring opening polymerization of oxazolidine derivatives. The chemically different amines in these two materials are notable since the primary amine having the high reactivity is often utilized for further cross-linking and derivatization of the material.

Although these two materials have been widely used, higher amine content materials and alternative compounds are still highly desired.

BRIEF SUMMARY OF THE INVENTION

The present invention relates to polymeric compositions comprising a repeat unit having the formula I, II, III, or IV Formula I

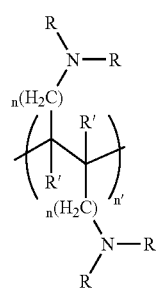

Formula II

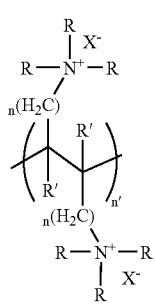

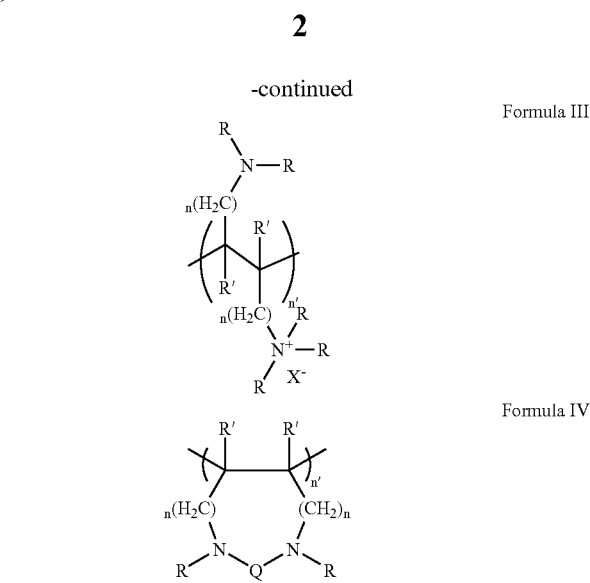

or a copolymer thereof, wherein n is zero, one, or greater than 1, n' is greater than 2, each R is independently a suitable chemical group that complements the valency of nitrogen, each R' is independently H, alkyl, or amino, $X^-$ is a negatively charged counterion, and Q is a bond, alkyl, alkylamino, alkylcarbonyl, alkenyl, aryl, or heterocyclyl.

In one embodiment, the polymer is a copolymer with one of the repeat units being a monomer of Formula I, II, III, or IV. In yet another embodiment, the polymers described herein are crosslinked.

One embodiment of the invention is a pharmaceutical composition comprising the polymers of the present invention with at least one pharmaceutical carrier. The polymers described herein have several therapeutic applications. For example, the polyvicinalamines are useful in removing phosphate, chloride, metallic iron, oxalate, and bile acids from the gastrointestinal tract. Also, these polymers can be used as bacteriostatic, bacteriocidal, antibiotic, and antiviral agents. In one embodiment, the polyvicinalamine polymers are used in the treatment of hyperphosphatemia, acidosis, iron poisoning, hyperoxaluria, hyperlipidemia, or hypercholesteremia.

DETAILED DESCRIPTION OF THE INVENTION

Polyvicinalamines

The present invention provides polymeric compositions comprising a polymer that contains vicinal amine moieties. Polymers, including homopolymers and copolymers, with vicinal amine repeat units are referred to herein as polyvicinalamines, polyvicinal amines, polyvicinalamine polymers, or polyvicinal amine polymers. The polymer is a homopolymer including repeat units of vicinal amines or is a copolymer including one or more repeat units of vicinal amines and other monomers such as acrylates, methacrylates, acrylamindes, methacrylamides, vinyl esters, vinyl amides, olefin, styrenic, etc. The size of the polymer can vary between, for example, about 500 to about 1,000,000 Daltons. The polymers of the present invention can be optionally crosslinked.

In one embodiment, the polymer is characterized by a repeating unit having the formula

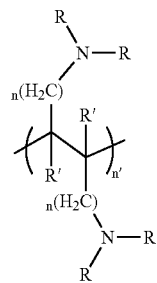

Formula I or a copolymer thereof, wherein n is zero, one, or greater than 1, n' is greater than 2, each R is independently a suitable chemical group that complements the valency of nitrogen, and each R' is independently H, alkyl, or amino.

Preferred polymers of Formula I include:

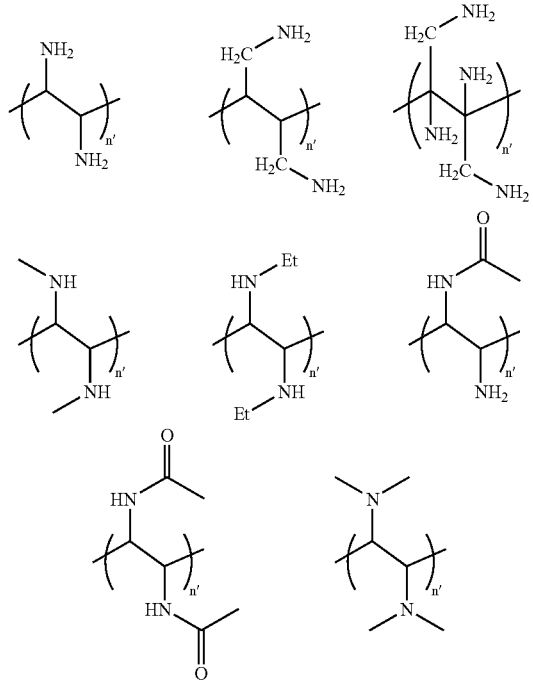

In a second embodiment, the polymer is characterized by a repeating unit having the formula

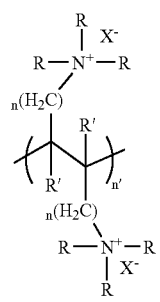

Formula II or a copolymer thereof, wherein n is zero, one, or greater than 1, n' is greater than 2, each R is independently a suitable chemical group that complements the valency of nitrogen, each R' is independently H, alkyl, or amino, and $X^-$ is a negatively charged organic or inorganic counterion.

Preferred polymers of Formula II include:

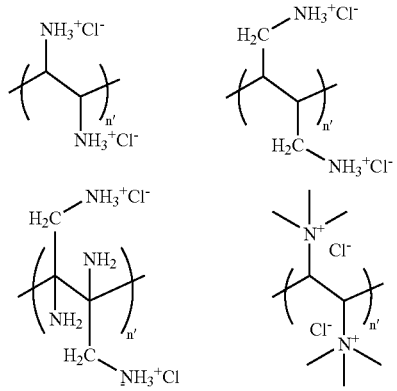

The polymers of the present invention also include polymers characterized by a repeat unit having the formula

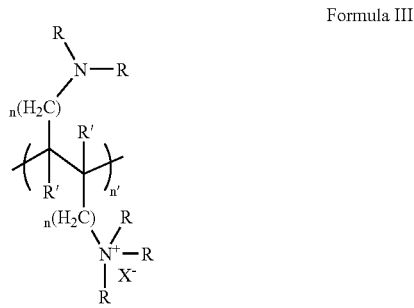

Formula III wherein n is zero, one, or greater than 1, n' is greater than 2, each R is independently a suitable chemical group that complements the valency of nitrogen, each R' is independently H, alkyl, or amino, and $X^-$ is a negatively charged organic or inorganic counterion.

In one embodiment, the R groups of neighboring nitrogen atoms are linked to each other to have a structure as depicted in Formula IV

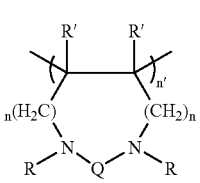

Formula IV wherein Q is a bond, alkyl, alkylamino, alkylcarbonyl, alkenyl, aryl, or heterocyclyl.

In the polymers described herein, n is zero, one, or greater than 1. In preferred embodiments, n is 0-5, even more preferably n is zero or 1.

In the embodiments described above, n' is greater than 2. The value of n' depends on the desired properties of the polymer, the potential use of the polymer, and the synthesis techniques used.

The pendant nitrogen atom of formulas I, II, III, and IV can be bound to atoms such as C, H, O, S, P and N such that the pendant groups are nitroso, nitro, nitroxide radical, nitrone, nitrene, isocyanate, carbazide, hydrazino, diazo groups, imine, amidine, guanidine, sulfamate, phosphoramidate, and heterocycle.

Examples of suitable R groups include H, halogen, R", $CO_2H$, $CO_2R"$, $COR"$, $C(=NR")(NR")$, CN, $CONH_2$, $CONR"_2$, $OR"$, $SO_3 R"$, $Si(R")_3$, and $P(O)(OR")_2$. Suitable R" groups include H, optionally substituted alkyl, acyl, alkylamino, alkenyl, heterocyclyl, and aryl group. Preferred R' is H, methyl, or amino.

The substituents for R" groups can be ionic entities with oxygen, nitrogen, phosphorus, or sulfur. Examples of substituents are carboxylate, sulfonate, sulfamate, sulfone group, phosphonate, phosphazene, phosphoramidate group, quaternary ammonium groups, or amine groups, e.g., primary and secondary alkyl or aryl amines. Examples of other suitable substituents include hydroxy, alkoxy, carboxamide, sulfonamide, halogen, alkyl, aryl, hydrazine, guanadine, urea, and carboxylic acid esters.

Preferred R groups include H and the following groups:

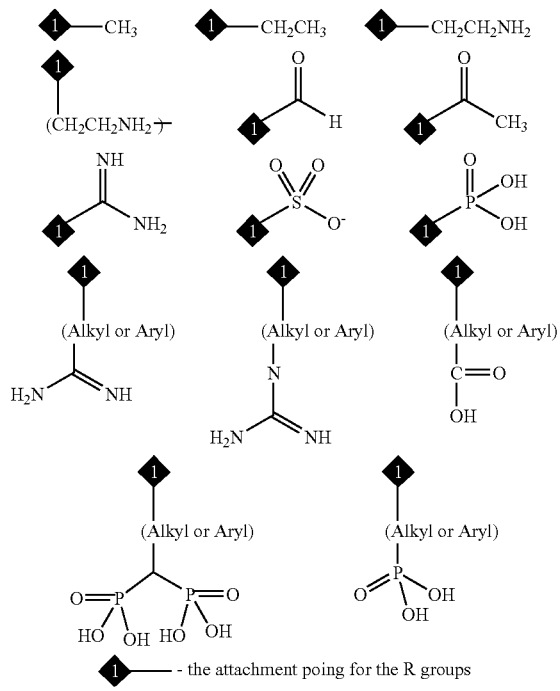

● —— - the attachment poing for the R groups

The negatively charged counterions, $X^-$, can be organic ions, inorganic ions, or a combination thereof. The inorganic ions suitable for use in this invention include halide (especially chloride), carbonate, bicarbonate, sulfate, bisulfate, hydroxide, nitrate, persulfate and sulfite. Suitable organic ions include acetate, ascorbate, benzoate, citrate, dihydrogen citrate, hydrogen citrate, oxalate, succinate, tartrate, taurocholate, glycocholate, and cholate. Preferred $X^-$ is chloride or carbonate.

In a preferred embodiment, the counterion does not have a detrimental side effect to the patient and is selected to have a therapeutic or nutritional benefit to the patient.

In one embodiment, the polymer is a copolymer with one of the repeat units being a monomer of Formula I, II, III, or IV. The copolymers of the present invention can be alternative or random copolymers. Generally, monomers that may be co-polymerized with the vicinalamine precursors include one or more monomers selected from the group consisting of styrene, substituted styrene, alkyl acrylate, substituted alkyl acrylate, alkyl methacrylate, substituted alkyl methacrylate, acrylonitrile, methacrylonitrile, acrylamide, methacrylamide, N-alkylacrylamide, N-alkylmethacrylamide, N,N-dialkylacrylamide, N,N-dialkylmethacrylamide, isoprene, butadiene, ethylene, vinyl acetate, N-vinyl amide, maleic acid derivatives, vinyl ether, allyle , methallyl monomers and combinations thereof. Functionalized versions of these monomers may also be used. Specific monomers or comonomers that may be used in this invention include, but are not limited to, methyl methacrylate, ethyl methacrylate, propyl methacrylate (all isomers), butyl methacrylate (all isomers), 2-ethylhexyl methacrylate, isobornyl methacrylate, methacrylic acid, benzyl methacrylate, phenyl methacrylate, methacrylonitrile, α-methylstyrene, methyl acrylate, ethyl acrylate, propyl acrylate (all isomers), butyl acrylate (all isomers), 2-ethylhexyl acrylate, isobornyl acrylate, acrylic acid, benzyl acrylate, phenyl acrylate, acrylonitrile, styrene, glycidyl methacrylate, 2-hydroxyethyl methacrylate, hydroxypropyl methacrylate (all isomers), hydroxybutyl methacrylate (all isomers), N,N-dimethylaminoethyl methacrylate, N,N-diethylaminoethyl methacrylate, triethyleneglycol methacrylate, itaconic anhydride, itaconic acid, glycidyl acrylate, 2-hydroxyethyl acrylate, hydroxypropyl acrylate (all isomers), hydroxybutyl acrylate (all isomers), N,N-dimethylaminoethyl acrylate, N,N-diethylaminoethyl acrylate, triethyleneglycol acrylate, methacrylamide, N-methylacrylamide, N,N-dimethylacrylamide, N-tert-butylmethacrylamide, N-n-butylmethacrylamide, N-methylolmethacrylamide, N-ethylolmethacrylamide, N-tert-butylacrylamide, N-n-butylacrylamide, N-methylolacrylamide, N-ethylolacrylamide, 4-acryloylmorpholine, vinyl benzoic acid (all isomers), diethylaminostyrene (all isomers), α-methylvinyl benzoic acid (all isomers), diethylamino a-methylstyrene (all isomers), p-vinylbenzene sulfonic acid, p-vinylbenzene sulfonic sodium salt, trimethoxysilylpropyl methacrylate, triethoxysilylpropyl methacrylate, tributoxysilylpropyl methacrylate, dimethoxymethylsilylpropyl methacrylate, diethoxymethylsilylpropyl methacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilylpropyl methacrylate, trimethoxysilylpropyl acrylate, triethoxysilylpropyl acrylate, tributoxysilylpropyl acrylate, dimethoxymethylsilylpropyl acrylate, diethoxymethylsilylpropyl acrylate, dibutoxymethylsilylpropyl acrylate, diisopropoxymethylsilylpropyl acrylate, dimethoxysilylpropyl acrylate, diethoxysilylpropyl acrylate, dibutoxysilylpropyl acrylate, diisopropoxysilylpropyl acrylate, maleic anhydride, N-phenylmaleimide, N-butylmaleimide, N-vinylformamide, N-vinyl acetamide, allylamine, methallylamine, allylalcohol, methyl-vinylether, ethylvinylether, butylvinyltether, butadiene, isoprene, chloroprene, ethylene, vinyl acetate and combinations thereof. The preferred monomers or comonomers are acrylamide, dimethylacrylamide, N-vinyl formamide, N-vinylacetamide, vinyl acetate, methyl acrylate, and butyl acrylate.

Polymers with one or more of the above repeat units are preferably crosslinked, in some cases by adding a crosslinking agent to the reaction mixture during or after polymerization. Preferred crosslinkers are compounds having at least two functional groups that are selected from halogen group, carbonyl group, epoxy group, ester group, acid anhydride group, acid halid group, isocyanate group, vinyl group, and chloroformate group. Preferably the crosslinking agent is attached to the carbon backbone or to the pendant nitrogen of the polyvicinalamine polymer. Examples of suitable crosslinking agents are diacrylates and dimethacrylates (e.g., ethylene glycol diacrylate, propylene glycol diacrylate, butylene glycol diacrylate, ethylene glycol dimethacrylate, propylene glycol dimethacrylate, butylene glycol dimethacrylate, polyethyleneglycol dimethacrylate, polyethyleneglycol diacrylate), methylene bisacrylamide, methylene bismethacrylamide, ethylene bisacrylamide, ethylenebismethacrylamide, ethylidene bisacrylamide, divinyl benzene, bisphenol A dimethacrylate, bisphenol A diacrylate, diepoxides, dihalides, diisocyanates, diacyl chlorides, dianhydrides, and dimethyl esters.

Examples of preferred crosslinkers are:

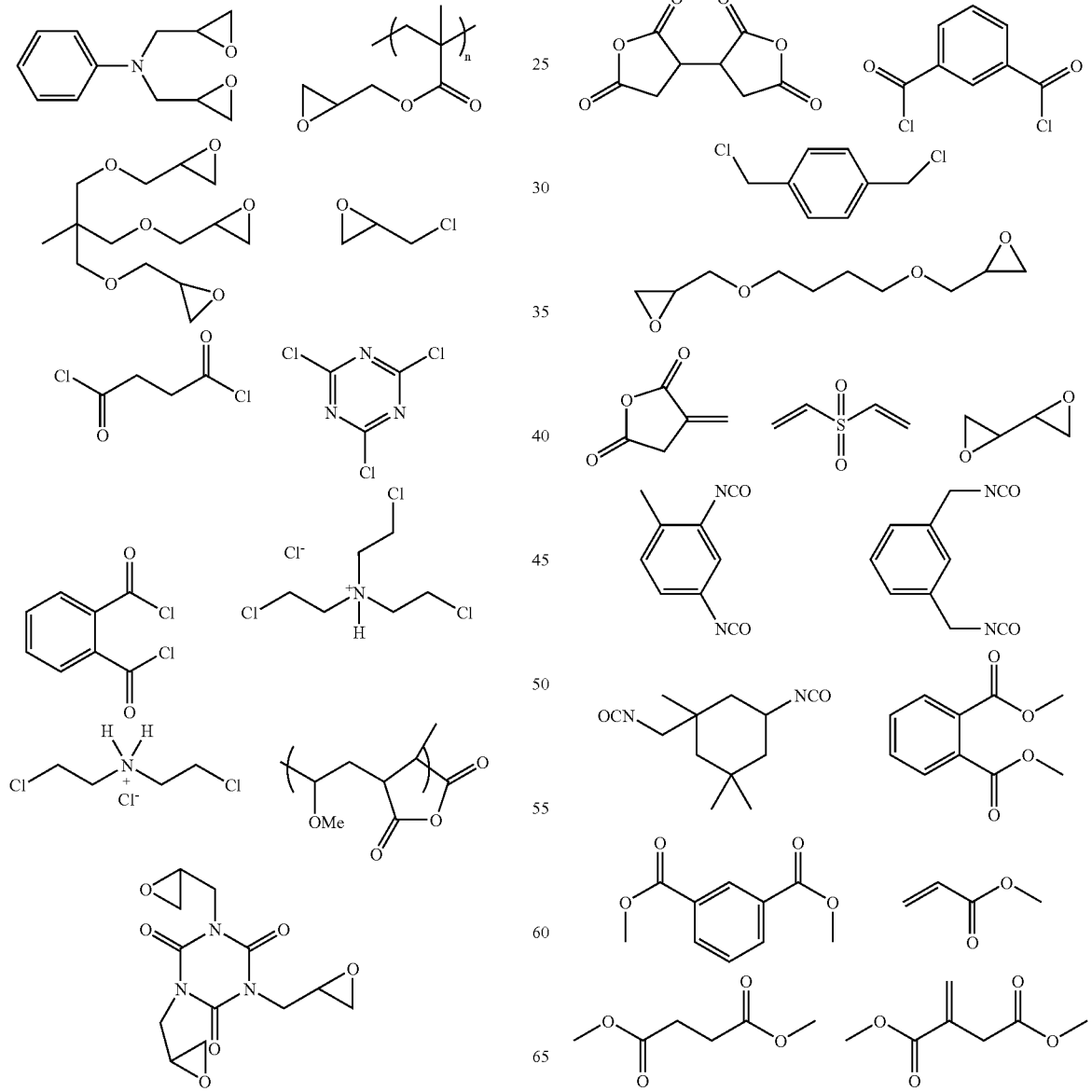

-continued

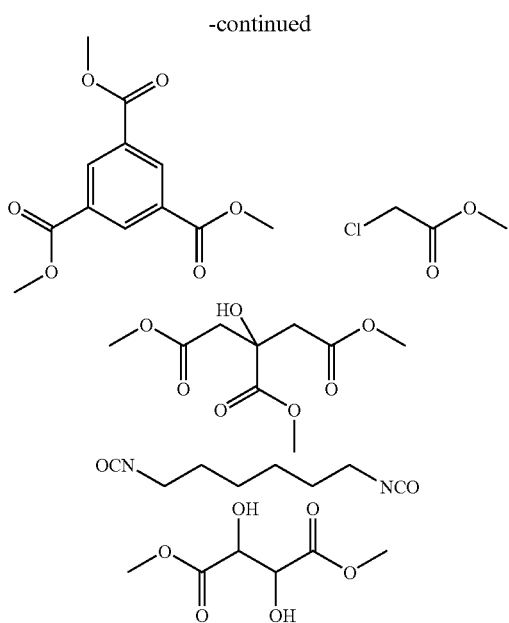

Preferred crosslinked polyvicinalamine polymers include

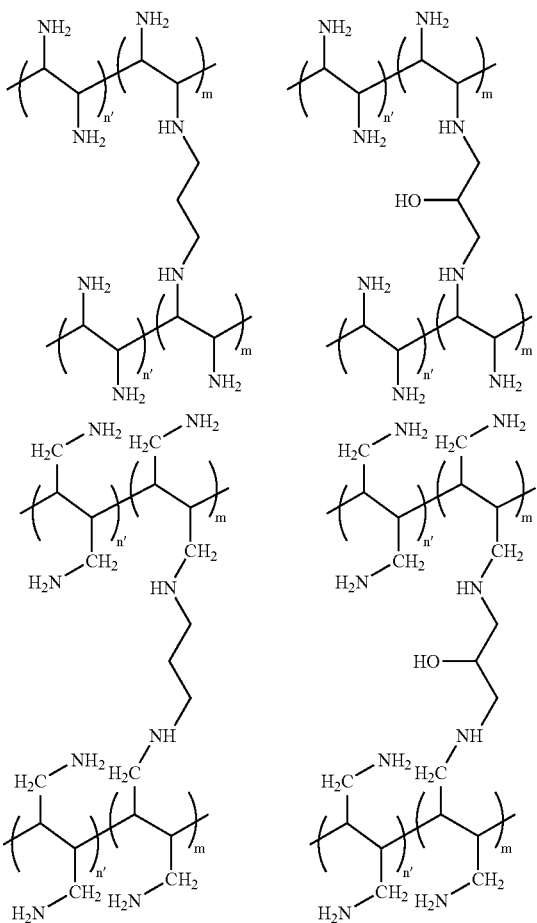

wherein m is one or greater than one. Preferably m is greater than 2, even more preferred is m greater than 5.

The amount of crosslinking agent is typically between about 0.5 and about 200% by weight, and preferably between about 1 and about 25% by weight, based upon the combined weight of crosslinking and monomer. In another embodiment, the crosslinking agent is present between about 2 and about 20% by weight of polymer.

In some cases the polymers are crosslinked after polymerization. One method of obtaining such crosslinking involves reaction of the polymer with difunctional crosslinkers, such as epichlorohydrin, succinyl dichloride, the diglycidyl ether of bisphenol A, pyromellitic dianhydride, toluene diisocyanate, and ethylenediamine. A typical example is the reaction of polyvicinalamine with epichlorohydrin. In this example the epichlorohydrin (1 to 200 parts) is added to a solution containing polyvicinalamine (100 parts) and heated to promote reaction. Other methods of inducing crosslinking on already polymerized materials include, but are not limited to, exposure to ionizing radiation, ultraviolet radiation, electron beams, radicals, and pyrolysis.

Examples of preferred crosslinking agents include epichlorohydrin, 1,4 butanedioldiglycidyl ether, 1,2 ethanedioldiglycidyl ether, 1,3-dichloropropane, 1,2-dichloroethane, 1,3-dibromopropane, 1,2-dibromoethane, succinyl dichloride, dimethylsuccinate, toluene diisocyanate, acryloyl chloride, methyl acrylate, ethylene bisacrylamide, and pyromellitic dianhydride.

Pharmaceutical Uses of Polyvicinalamines

The polyvicinalamines of the present invention have several therapeutic applications. In particular, the polyvicinalamines are useful as anion exchange resins. Due to the high density of amine groups in the polymers of the present invention, these polymers are particularly useful in the binding and excretion of negatively charged ions from the body. Also, because of the spatial arrangement of the nitrogen atoms and hydrogen atoms bound thereto, these polymers can exhibit high binding characteristics to metallic ions as well. These polymers can be administered orally to bind and remove from an animal subject various negatively charged entities and metallic species from the gastro-intestinal tract. In one embodiment, the polyvicinalamines of the present invention are used to remove phosphate, oxalate, bile acids, small molecules, proteins, metallic ions such as those comprised within the $6^{th}$ and the $11^{th}$ groups and $4^{th}$ and $6^{th}$ periods of the Periodic Table, also including the Lanthanoids and the Actanoids. Such polymers are also strongly basic and therefore useful, when ingested in the unprotonated form, to decrease acidity without introducing detrimental ions, from patients suffering from acidosis, heartburn, acid reflux disease, sour stomach, or gastritis.

The present invention provides methods, pharmaceutical compositions, and kits for the treatment of animal subjects. The term "animal" and "animal subject" as used herein includes humans as well as other mammals.

In one embodiment, the polyvicinalamines are used in the treatment of phosphate imbalance disorders. The term "phosphate imbalance disorder" as used herein refers to conditions in which the level of phosphorus present in the body is abnormal. One example of a phosphate imbalance disorder includes hyperphosphatemia. The term "hyperphosphatemia" as used herein refers to a condition in which the element phosphorus is present in the body at an elevated level. Typically, a patient is often diagnosed with hyperphosphatemia if the blood phosphate level is, for example, above 4.5 milligrams per deciliter of blood and/or glomerular filtration rate is reduced to, for example, more than 20%.

In one embodiment, polyvicinalamine polymers are co-administered with a gastric pH modulator, like proton pump inhibitors, histamine $H_2$ receptor antagonists, and antacids. This co-administration improves the efficacy of phosphate binding by the polyvicinalamine polymer.

Other diseases that can be treated with the methods and compositions of the present invention include hypocalcemia, hyperparathyroidism, depressed renal synthesis of calcitriol, tetany due to hypocalcemia, renal insufficiency, and ecotopic calcification in soft tissues including calcifications in joints, lungs, kidney, conjuctiva, and myocardial tissues. Also, the present invention can be used to treat ESRD and dialysis patients. In one embodiment, the polyvicinalamine polymers are used for prophylactic treatment of diseases.

The polymers described herein can be used to treat diseases wherein a reduction in physiological levels of salt is desired. For instance the polymer of the invention as a free base can be advantageously used as an adjunct to cation exchange resins, e.g., polystyrenesulfonate resin in the proton of potassium form, to remove anions such as chloride.

Also, the polymers described herein can be used as an adjunct to therapy employing acid exchange resins to neutralize the load of acid released upon uptake of sodium ions, therefore minimizing the risk of acidosis in patients.

In one embodiment, the polymers of the present invention are used to treat metallic poisoning, like iron poisoning. Iron poisoning typically is a result of children inadvertently taking iron supplement tablets. In iron overdose, binding of iron to oral charcoal, bicarbonate, deferoxamine, or magnesium hydroxide are typical treatments. Gastric lavage and profuse oral fluids are used to try to flush out the iron tablets. Non-absorbable polyvicinalamine polymers with iron chelating properties can be used for removal of metallic iron.

Binding of bile acids in the gastro-intestinal tract is one therapeutic strategy to treat several disorders, including lipid disorders in patients who exhibit high levels of total serum cholesterol and low-density lipoprotein cholesterol (LDL-C). There is strong evidence that elevated plasma levels of LDL-C, along with triglyceride increases and low levels of HDL-C, are associated with an increased risk of coronary heart disease. Cholesterol that ultimately is incorporated into LDL-C is introduced through endogenous and exogenous routes. Endogenous cholesterol is defined as cholesterol produced by hepatic and extrahepatic tissues, while exogenous cholesterol is defined as dietary cholesterol absorbed from the intestine. In addition to these sources, bile acids that are secreted into the intestinal tract to enhance digestion and absorption of cholesterol, fats, and fat-soluble vitamins, are also derived from cholesterol of hepatic origin. Most of the bile acid delivered to the duodenum (~95%) is reabsorbed in the terminal ileum and returned to the liver through portal circulation (i.e., enterohepatic recirculation). Polyvicinalamines bind the bile acids and prevent enterohepatic recirculation. The polymer-bound bile acid is eliminated from the body with the feces. The impairment of bile acid return results in upregulation of hepatic bile acid synthesis enzymes (such as cholesterol-7-α-hydroxylase), resulting in greater hepatic breakdown of cholesterol for bile acid production. The reduction of intrahepatic cholesterol secondarily up regulates hepatic LDL receptors, resulting in increased clearance of LDL-C from the blood and an overall lowering of the LDL-C serum level. Polyvicinalamines bind biliary acids in the gastro-intestinal tract, thus allowing a lower dosing regimen of these bile acid binders and improving patient compliance.

The polymers of the present invention also show utility in binding dietary oxalate in patients who suffer from hyperoxaluria, i.e. abnormally high levels of oxalate in the urine. Elevated urine oxalate levels are one of the causes of calcium-stone formation (i.e., kidney stones). Most calcium stones are composed of calcium oxalate, either alone or in combination with calcium phosphate or calcium urate. Elevated urinary oxalate levels can result from excessive dietary intake of oxalate (dietary oxaluria), gastrointestinal disorders that lead to malabsorption of oxalate (enteric oxaluria), or an inherited enzyme deficiency that results in excessive metabolism of oxalate (primary hyperoxaluria or PH). Dietary and enteric oxaluria can be treated with diet restriction or modifications to restrict intake of foods with high oxalate content, however patient compliance is often difficult owing to the wide distribution of oxalate and purine derivatives in many foods. Calcium carbonate tablets (500-650 mg/tablet; 3 tablets per meal) can also be taken to bind and remove intestinal oxalate, but again patient compliance is difficult owing to the amount of calcium carbonate needed. Polyvicinalamines have high binding constants for oxalate and can be used to remove oxalate from the gastrointestinal tract and subsequently lower the risk of kidney stone formation.

In the present invention, the polyvicinalamines can be co-administered with other active pharmaceutical agents depending on the condition being treated. This co-administration can include simultaneous administration of the two agents in the same dosage form, simultaneous administration in separate dosage forms, and separate administration. For example, for the treatment of hyperphosphatemia, the polyvicinalamines can be co-administered with calcium salts which are used to treat hypocalcemia resulting from hyperphosphatemia. The calcium salt and polyvicinalamine can be formulated together in the same dosage form and administered simultaneously. Alternatively, the calcium salt and polyvicinalamine can be simultaneously administered, wherein both the agents are present in separate formulations. In another alternative, the calcium salt can be administered just followed by the polyvicinalamine, or vice versa. In the separate administration protocol, the polyvicinalamine and calcium salt may be administered a few minutes apart, or a few hours apart, or a few days apart.

Polyvicinalamines are also useful in deactivation of prions. Several lines of evidence suggest that high-density amine polymers induce a conformational change that renders prion molecules more susceptible to proteases. The polymers of the present invention may be used to destroy prions in contaminated cells.

The polyvicinalamine polymers are also useful as bacteriostatic, bacteriocidal, antibiotic, and antiviral agents. Polyvicinalamines can be used additionally as antiseptics, disinfectants, preservatives, and sanitizers. The activity of polyvicinalamines is primarily determined by concentration: at low concentration levels (<10 μg/ml) the compounds act to inhibit growth (stasis) of bacteria, mycoplasmas (cell wall-less bacterial forms), yeast and fungi; at medium to high concentrations (>10-100 μg/ml) the compounds inactivate cells (cidality) resulting in cell death of bacteria, yeast, and fungi. Viruses are also inactivated by polyvicinalamines, including lipid-enveloped viruses; examples of viruses inactivated by these polymers include human immunodeficiency virus (HIV), hepatitis B virus (HBV), herpes simplex virus (HSV), hepatitis C virus (HCV), small non-encapsulated viruses including picoma, HAV, HEV and large non-encapsulated viruses including adenovirus. One mechanism by which polyvicinalamines disrupt microbial cell targets is by binding and penetrating the cell surface, causing a dissipation of the membrane-generated pH gradient, leakage of intracellular constituents, lysis of protoplasts, and gross damage to the cell membrane. Polyvincinalamine polymers can prevent outgrowth of germinating bacterial spores with a mode of action that is static or cidal depending on concentration of the polymer used.

The term "treating" as used herein includes achieving a therapeutic benefit and/or a prophylactic benefit. By therapeutic benefit is meant eradication, amelioration, or prevention of the underlying disorder being treated. For example, in a hyperphosphatemia patient, therapeutic benefit includes eradication or amelioration of the underlying hyperphosphatemia. Also, a therapeutic benefit is achieved with the eradication, amelioration, or prevention of one or more of the physiological symptoms associated with the underlying disorder such that an improvement is observed in the patient, notwithstanding that the patient may still be afflicted with the underlying disorder. For example, administration of polyvicinalamines to a patient suffering from renal insufficiency and/or hyperphosphatemia provides therapeutic benefit not only when the patient's serum phosphate level is decreased, but also when an improvement is observed in the patient with respect to other disorders that accompany renal failure and/or hyperphosphatemia like ectopic calcification and renal osteodistrophy. For prophylactic benefit, the polyvicinalamines may be administered to a patient at risk of developing hyperphosphatemia or to a patient reporting one or more of the physiological symptoms of hyperphosphatemia, even though a diagnosis of hyperphosphatemia may not have been made.

The pharmaceutical compositions of the present invention include compositions wherein the polyvicinalamine polymers are present in an effective amount, i.e., in an amount effective to achieve therapeutic or prophylactic benefit. The actual amount effective for a particular application will depend on the condition being treated and the route of administration. Determination of an effective amount is well within the capabilities of those skilled in the art, especially in light of the disclosure herein.

The effective amount for use in humans can be determined from animal models. For example, a dose for humans can be formulated to achieve circulating and/or gastrointestinal concentrations that have been found to be effective in animals.

The dosages of the polyvicinalamines in animals will depend on the disease being, treated, the route of administration, and the physical characteristics of the patient being treated. Dosage levels of the polyvicinalamines for therapeutic and/or prophylactic uses can be from about 1 gm/day to about 30 gm/day. It is preferred that these polymers are administered along with meals. The polymers may be administered one time a day, two times a day, or three times a day. The preferred dosage range is from about 2 gm/day to about 20 gm/day and an even preferred dosage range is about 3 gm/day to about 7 gm/day.

Preferably, the polyvicinalamines used for therapeutic and/or prophylactic benefits can be administered alone or in the form of a pharmaceutical composition. The pharmaceutical compositions comprise of the polyvicinalamines, one or more pharmaceutically acceptable carriers, diluents or excipients, and optionally additional therapeutic agents. The polymer can be administered by injection, topically, orally, transdermally, or rectally. Preferably, the polymer or the pharmaceutical composition comprising the polymer is administered orally. The oral form in which the polymer is administered can include powder, tablet, capsule, solution, or emulsion. The therapeutically effective amount can be administered in a single dose or in a series of doses separated by appropriate time intervals, such as hours.

Pharmaceutical compositions for use in accordance with the present invention may be formulated in conventional manner using one or more physiologically acceptable carriers comprising excipients and auxiliaries which facilitate processing of the active compounds into preparations which can be used pharmaceutically. Proper formulation is dependent upon the route of administration chosen. Suitable techniques for preparing pharmaceutical compositions of the polyvicinalamines are well known in the art.

Non-Pharmaceutical Uses of Polyvicinalamines

The polyvicinalamine polymers disclosed herein are suitable for use in several industrial applications. Particularly, the polyvicinalamines are useful in applications that require high affinity to surfaces, charge reversal/neutralization, adhesion, interaction with colloids, metal binding, etc. Examples of industrial applications are provided herein. Other suitable applications will be apparent to one of skill in the art based on the disclosure provided herein.

Polyvicinalamine polymers are suitable replacements for polyamine polymers, like polyvinylamines and polyethyleneimines, in industrial applications. In particular, the polyvicinalamine are suitable replacements in situations in which the polyamine polymers are used due to their high amine content. The polyvicinalamine polymers described herein are more suitable than the prior art polyamine polymers due to their higher amine content.

In one embodiment, polyvicinalamine polymers are useful in the synthesis of membranes used in the reverse osmosis process. Asymmetric membranes are generally used in the reverse osmosis process. These asymmetric membranes comprise a homogeneous polymer layer applied to a microporous or porous structure. The polymers described herein can be used in the synthesis of the polymer layer of the asymmetric membranes.

The polyvicinalamines are suitable for use in the paper industry. The can be used to charge-neutralize negatively charged colloidal matters and facilitate flocculation and decantation.

In another embodiment, the polyvicinalamine polymers are used to bind metal ions. The polymers of the present invention can chelate heavy metals and therefore are useful in removal of heavy metal in wastewater and recovery of useful metals.

The polyvicinalamine polymers are also useful in the field of heterogeneous catalysis described by Meyers et al. (*J. Am. Chem. Soc.* 1977, 99, 6141). The polymers described herein can be used to manufacture polymer supported metal catalysts that are useful as catalysts in areas such as benzyl type protecting group cleavage, reductions of aromatic-nitro groups, and peptide syntheses.

The high binding affinity of polyvicinalamines to metals is advantageous in applications such as corrosion inhibitor, lubricants and cleaners of metal surfaces. Polyvicinalamines are also useful in formulations in personal care to promote oil deposition to skin care products, as well as in hair conditioners and shampoos. Other uses include as primer additive and dispersants in paints, inks, and textiles, and as scavengers of acid gas such as $CO_2$, $NO_x$, $SO_x$, and $Cl_2$.

Also, the polymers described herein have numerous applications in the biotechnology industry. Nucleic acids, which are polyanions at physiological pH, can be bound to the polymers of the present invention to facilitate the introduction of the nucleic acids into target cells in their intact and functional form. Thus, the polyvicinalamines can be used to produce effective gene therapy by facilitating the delivery and uptake of DNA or RNA into cells. Also, these polymers can be used to bind proteins to promote their transportation into cells. Further, polyvicinalamines are useful in immobilizing cells in a variety of applications, for example to retain cells in fermentation reactors.

In one embodiment, the polyvicinalamines are used in detergent compositions. The polyvicinalamines are useful in the detergent compositions due to their anti-dye transfer, color protection, and stain removal properties.

Synthesis of Polyvicinalamines

The polyvicinalamine polymers of the present invention, including homopolymers and copolymers, are synthesized by first polymerizing by either free radical means or cationic means followed by removal of a protecting group.

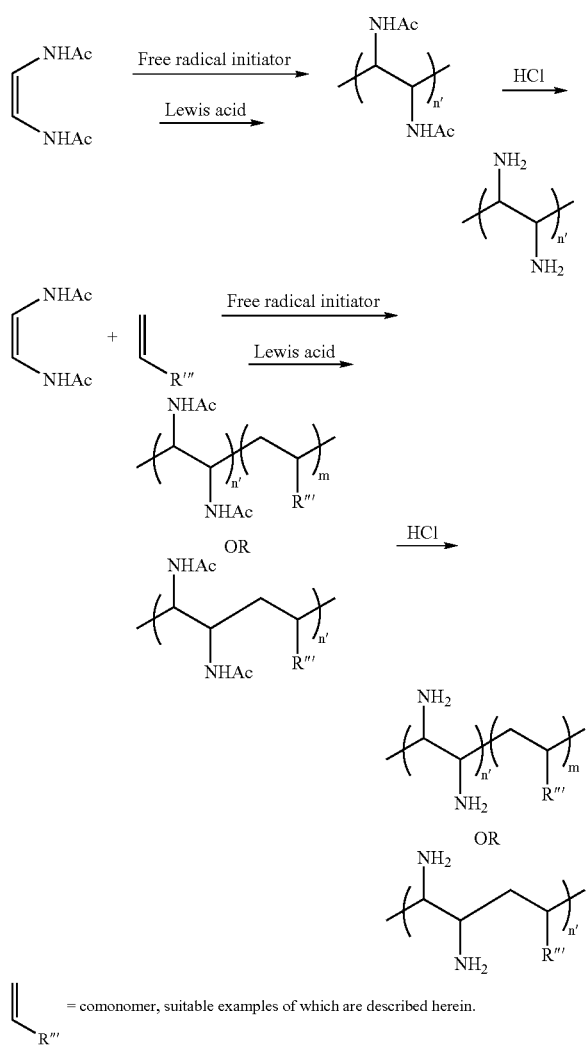

Suitable synthesis techniques include by addition polymerization of vicinal amine precursor monomers or post modification of polymaleamide polymer. The latter method consists in polymerizing maleamide monomer and subjecting the resulting polymer to either hydrogenation or Hoffman rearrangement reaction conditions to provide the desired vicinal amine containing polymers. The former method includes addition polymerization using cationic propagation and free radical propagation.

When a cationic process is used, the vicinalamine precursor monomer is treated with a catalyst to initiate the polymerization. Optionally, one or more other monomers as depicted above is used to form a copolymer. The catalyst, also referred to as an initiator, could be protonic acids (Bronsted acid) or Lewis acids, in the case of using Lewis acid some promoter such as water or alcohols can also used. The catalyst maybe hydrogen iodide, perchloric acid, sulfuric acid, phosphoric acid, hydrogen fluoride, chlorosulfonic acid, methansulfonic acid, trifluoromehtanesulfonic acid, aluminum trichloride, alkyl aluminum chlorides, boron trifluoride complexes, tin tetrachloride, antimony pentachloride, zinc chloride, titanium tetrachloride, phosphorous pentachloride, phosphorus oxychloride, or chromium oxychloride. The reaction is carried out in a solvent. The solvent maybe pentane, hexane, dichloromethane, chloroform, or dimethyl formamide. The suitable reaction temperature is from about −50° C. to about 100° C., preferably from about 0° C. to about 70° C.

When a free radical polymerization process is used, the vicinal amine precursor monomer, optionally a comonomer, and a source of radical are provided to trigger a free radical polymerization process. The source of free radicals is optional because some monomers may self-initiate upon heating at high temperature. After forming the polymerization mixture, the mixture is subjected to polymerization conditions. Polymerization conditions are those conditions that cause at least one monomer to form at least one polymer, as discussed herein, such as temperature, pressure, atmosphere, ratios of starting components used in the polymerization mixture and reaction time. The polymerization can be carried out in solution, dispersion, suspension, emulsion or bulk.

Initiators, as discussed above, may be optional. When present, initiators useful in the polymerization mixture and the inventive process are known in the art, and may be selected from the group consisting of alkyl peroxides, substituted alkyl peroxides, aryl peroxides, substituted aryl peroxides, acyl peroxides, alkyl hydroperoxides, substituted alkyl hydroperoxides, aryl hydroperoxides, substituted aryl hydroperoxides, heteroalkyl peroxides, substituted heteroalkyl peroxides, heteroalkyl hydroperoxides, substituted heteroalkyl hydroperoxides, heteroaryl peroxides, substituted heteroaryl peroxides, heteroaryl hydroperoxides, substituted heteroaryl hydroperoxides, alkyl peresters, substituted alkyl peresters, aryl peresters, substituted aryl peresters, and azo compounds. Specific initiators include benzoylperoxide (BPO) and AIBN.

Free radical polymerization processes can also be carried out in a living mode, using methods, such as Atom Transfer Radical Polymerization (ATRP), Nitroxide mediated living free radical polymerization or Reversible Addition Fragmentation Transfer (RAFT). RAFT process is preferred, in particular using chain transfer agents described in U.S. Pat. No. 6,518,364. Using conventional and living/controlled polymerizations methods, various polymer architectures can be produced, such as block, graft, star and gradient copolymers, whereby the vicinal amine moieties are either distributed statistically across the chain or homopolymerized in block sequence or pendant grafts.

Since the free vicinal amine monomer cannot be isolated because of its instability, the vicinal amine monomer is polymerized in a protected form, referred to as "vicinal amine precursor". Typical vicinal amine precursors suitable for the invention include:

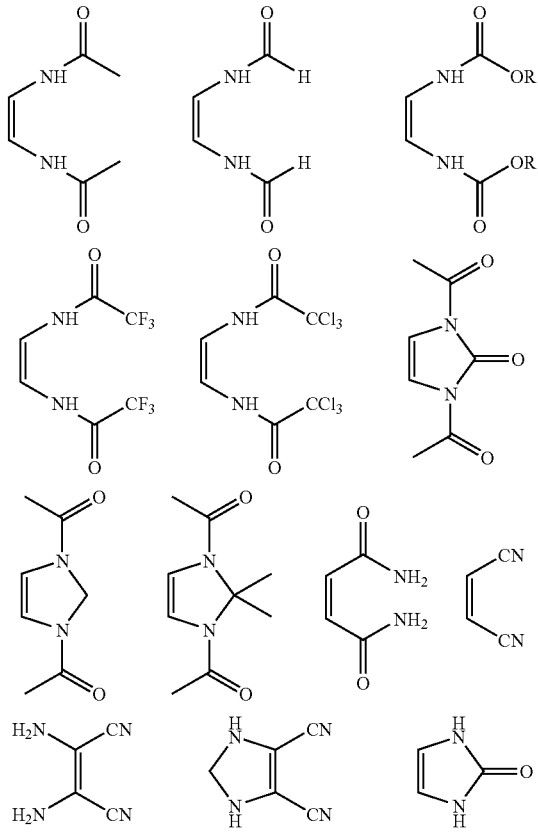

After polymerization, which can be either free radical or cationic, the material is then subjected to deprotection reaction conditions, such as hydrolysis or hydrogenation.

The starting material for the synthesis of polyvicinalamine can include 1,2 cis-di-N-protected aminoethylene or maleamide. Scheme 1 depicts synthesis of polyvicinalamines using 1,2 cis-di-N-protected aminoethylene and scheme 2 depicts the synthesis using maleamide as the starting monomer. In another embodiment, a maleamide precursor is polymerized and the obtained polymer subjected to conditions to generate a vicinalamide polymer, which can then be transformed in the desired vicinalamine through hydrogenation or Hoffmann rearrangement reaction. In yet another embodiment, polymaleamide is synthesized by amidification of polymaleic anhydride or polymaleic acid. The protecting group can be removed by hydrolysis under acidic or basic conditions. In the case of maleamide, Hofmann rearrangement conditions can be applied to remove the protecting groups. Free radical polymerization can be performed in bulk, solution, or suspended medium with common radical source such as azos and peroxides. The reaction temperature is between room temperature and 150° C. with reaction time from 0.5 hour to 24 hours. Slow feed process can be adapted in a copolymerization of one or more monomers to match their reactivity. For cationic polymerization either Bronsted acid or Lewis acid can be used as catalyst.

SCHEME 1

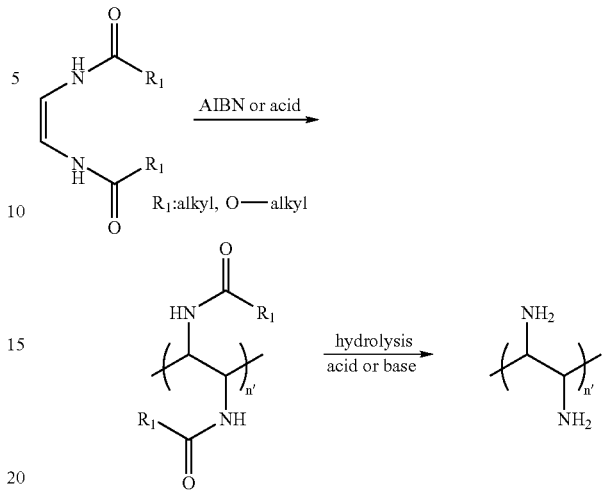

SCHEME 2

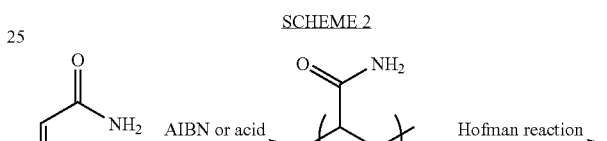

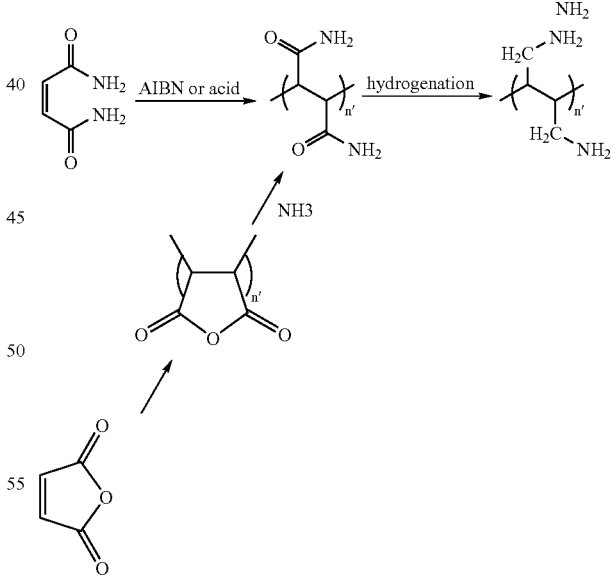

Maleamide is commercially available. Particularly useful cis-1,2-di-protected amino ethylenes for the synthesis of polyvicinalamines include cis-1,2-diacetamidoethylene, cis-N,N'-dicarbethoxy-1,2-diaminoethene, and cis-1,2-formamidothylene. Numerous techniques are known in the art for the synthesis of cis-1,2-di-protected amino ethylenes. See *J. Am. Chem. Soc.* 1980, 102, 6784. For the present invention, the most desired monomer is the corresponding formamidoethylene. An example of a synthetic scheme for the synthesis of cis-1,2-formamidothylene is depicted below in Scheme 3. This synthetic scheme involves the Bamberger cleavage of imidazole.

SCHEME 3

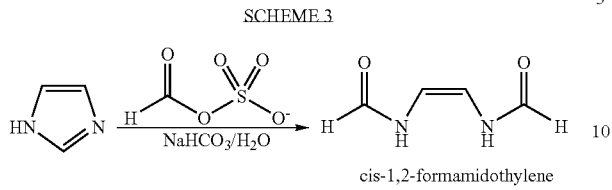

cis-1,2-formamidothylene

Scheme 4 depicts a synthesis scheme with fumarodinitrile as the starting material.

SCHEME 4

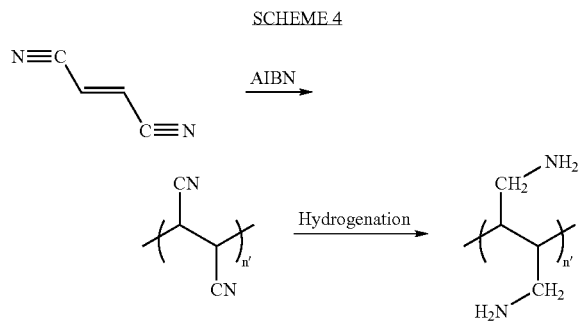

EXAMPLES

Example 1

Synthesis of cis-1,2-diacetamidoethylene

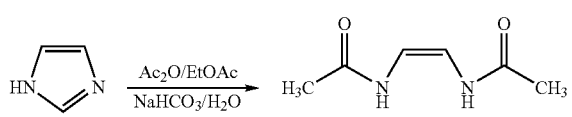

To a solution of imidazole (68 g, 1 mole) in ethyl acetate (1 L) in a 10-L container was added sodium bicarbonate (0.85 kg, 10 mole) and water (5 L) at ambient temperature. Under magnetic agitation, acetic anhydride (400 mL, 4.04 mole) was added dropwise over a course of 45 minutes. The resulting mixture was stirred overnight (12 hours). Then, the solid was filtered out, washed, and triturated (in 600 mL water) at 80° C. for 30 min. After filtration, the product was collected in 120 g (ca. 80%).

Example 2

Copolymerization of cis-1,2-diacetamidoethylene and N-vinyl acetamide

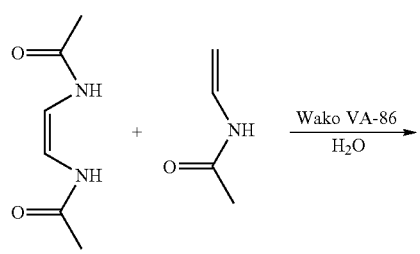

-continued

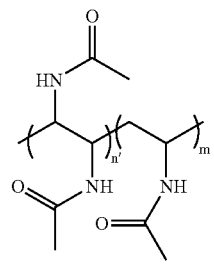

A 50-mL flask equipped with magnetic stir bar and a reflux condenser was charged with cis-1,2-diacetamidoethylene (2 g, 14.1 mmol), N-vinyl acetamide (1.2 g, 14.1 mmol), 2,2'-azobis[2-methyl-N-(2-hydroxyethyl)propionamide] (Wako VA-086) (65 mg, 2 wt %), and water (6 mL) at ambient temperature. Under nitrogen atmosphere the resulting mixture was brought to 85° C. in an oil bath in 20 minutes and maintained for 12 hours. The resulting solution was then precipitated into hot isopropanol. The product was collected in 2.65 g (ca. 83%, Mn 78260, Mw 194200, PDI 2.48). The ratio of monomer incorporation (cis-1,2-diacetamidoethylene/N-vinyl acetamide) was 0.7/1 based on $^1$H NMR.

Example 3

Copolymerization of cis-1,2-diacetamidoethylene and acrylamide

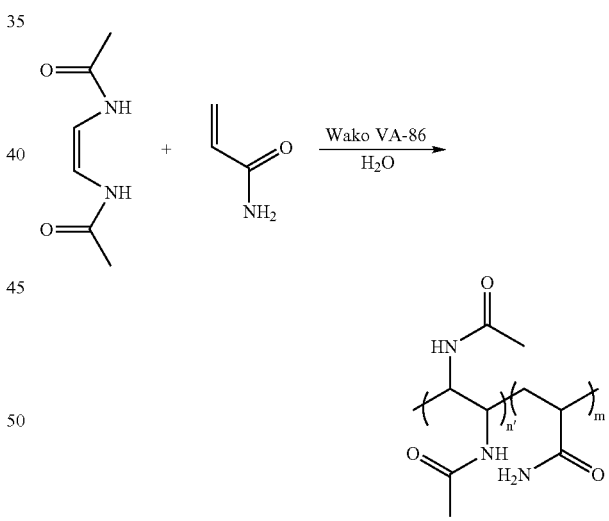

A 50-mL flask equipped with magnetic a stir bar and a reflux condenser was charged with cis-1,2-diacetamidoethylene (2 g, 14.1 mmol), acrylamide (1 g, 14.1 mmol), 2,2'-azobis[2-methyl-N-(2-hydroxyethyl)propionamide] (Wako VA-086) (60 mg, 2 wt %), and water (6 mL) at ambient temperature. Under nitrogen atmosphere the resulting mixture was brought to 85° C. in an oil bath in 20 minutes and maintained for 12 hours. The resulting solution was then precipitated into hot isopropanol. The product was collected in 2.1 g (ca. 70%). The ratio of monomer incorporation (cis-1,2-diacetamidoethylene/N-vinyl acetamide) was 0.6/1 based on $^1$H NMR.

Example 4

Copolymerization of cis-1,2-diacetamidoethylene and N-vinyl formamide

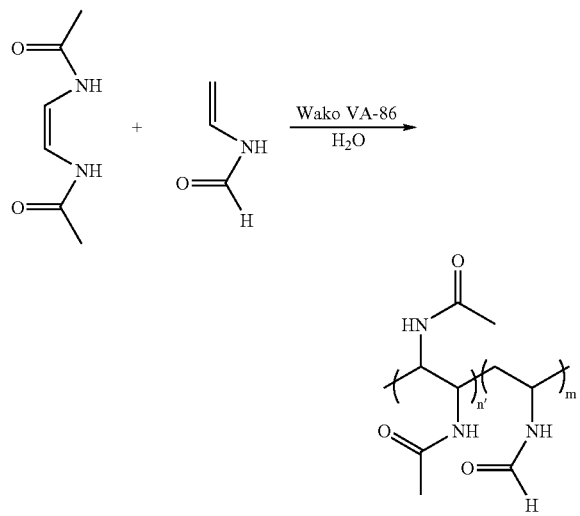

A 50-mL flask equipped with magnetic a stir bar and a reflux condenser was charged with cis-1,2-diacetamidoethylene (2 g, 14.1 mmol), N-vinyl formamide (1 g, 14.1 mmol), 2,2'-azobis[2-methyl-N-(2-hydroxyethyl)propionamide] (Wako VA-086) (60 mg, 2 wt %), and water (6 mL) at ambient temperature. Under nitrogen atmosphere the resulting mixture was brought to 85° C. in an oil bath in 20 minutes and maintained for 12 hours. The resulting solution was then precipitated into hot isopropanol. The product was collected in 2.3 g (ca. 77%%, Mn 35650, Mw 80230, PDI 2.25). The ratio of monomer incorporation (cis-1,2-diacetamidoethylene/N-vinyl acetamide) was 0.65/1 based on $^1$H NMR.

Example 5

Cationic polymerization of cis-1,2-diacetamidoethylene

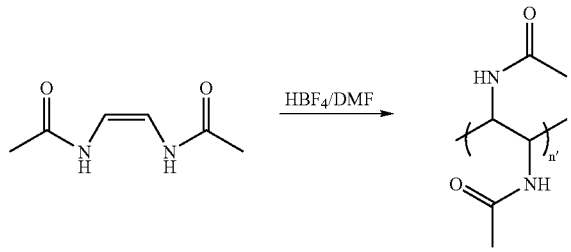

A 25-mL flask equipped with magnetic a stir bar under nitrogen atmosphere was charged with cis-1,2-diacetamidoethylene (2 g, 14.1 mmol), HBF$_4$ (5 mole %, 40 wt % in ether) and anhydrous DMF (3 mL) at ambient temperature. The resulting mixture was brought to 50° C. in an oil bath in 20 minutes and monitored by proton NMR until the monomer was totally consumed. The resulted reaction mixture was a combination of short chain oligomers.

Example 6

Polymerization of cis-1 12-diacetamidoethylene

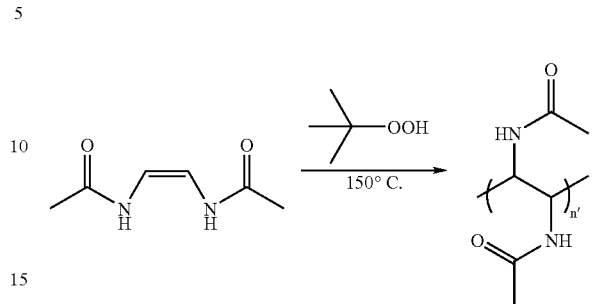

A 25-mL flask equipped with magnetic a stir bar under nitrogen atmosphere is charged with cis-1,2-diacetamidoethylene (4 g, 28.2 mmol) at ambient temperature. The reaction vessel is brought to 150° C. with an oil bath. To the resulting mixture liquid tert-butyl hydrogen peroxide (5 mole %, 1.41 mmole) is added and the reaction is maintained at 150° C. for 12 hours. The workup consists of bringing the reaction temperature to 95° C., addition of 4 mL of water, and then precipitating into hot isopropanol.

Example 7

Polymerization of Maleamide and Hofman Rearrangement

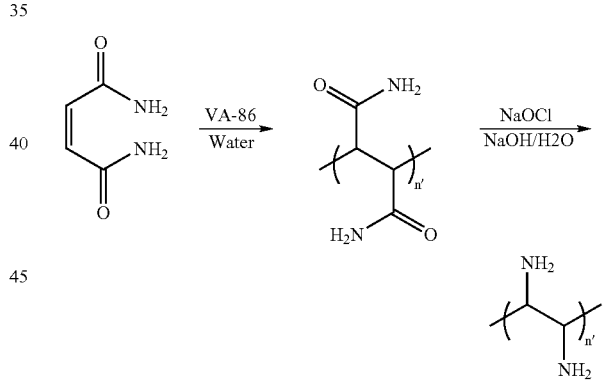

A 25-mL flask equipped with magnetic a stir bar and a reflux condenser is charged with maleamide (2.28 g, 20 mmol), 2,2'-azobis[2-methyl-N-(2-hydroxyethyl)propionamide] (Wako VA-086) (50 mg, 2 wt %), and water (2 mL) at room temperature. Under nitrogen atmosphere the resulting mixture is brought to 90° C. in an oil bath in 30 minutes and maintained for 12 hours. The workup consists of addition of 2 mL of water and then precipitating into methanol. After the precipitant is dried, it (2 g) is dissolved in 20 mL of water and cooled down to 0° C. The resulting reaction mixture is then added to a pre-cooled (−5° C.) mixture of 2M NaCl (10 mL), 15M NaOH (2 mL), and water (2 mL) under vigorous stirring. The resulting solution is brought to −10° C. and followed by addition of a cooled 11M NaOH (20 mL) solution under vigorous stirring. After one hour, the reaction mixture is then placed in an ice bath for 15 hours.

Example 7

Hydrolysis of Poly cis-1,2-diacetamidoethylene-co-N-vinyl acetamide

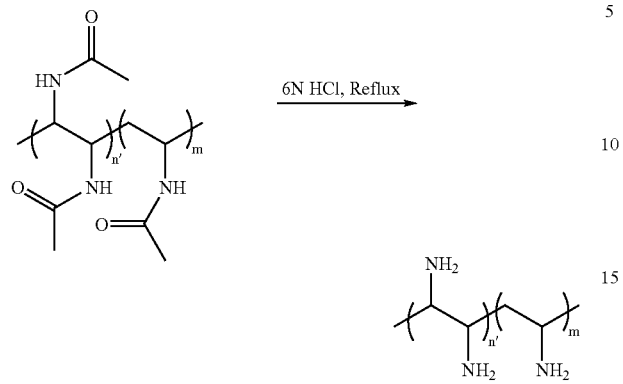

A 100-mL flask equipped with magnetic stir bar and a reflux condenser was charged with poly cis-1,2-diacetamidoethylene-co-N-vinyl acetamide from Example 2 (2.5 g) and 50 mL of 6N HCl at ambient temperature. Under nitrogen atmosphere the resulting mixture was heated to reflux in an oil bath for 120 hours. The resulting solution was then neutralized with $K_2CO_3$ to pH 5, then followed by dialysis in water for 24 hours. After lyophilization the product was collected in 0.83 g (yield 84%, ca. 75% deacetylation).

All publications and patent applications mentioned in this specification are herein incorporated by reference to the same extent as if each individual publication or patent application was specifically and individually indicated to be incorporated by reference.

It will be apparent to one of ordinary skill in the art that many changes and modifications can be made thereto without departing from the spirit or scope of the appended claims.

What is claimed is:

1. A method of treating an animal subject, comprising administering to an animal subject in need thereof an effective amount of the pharmaceutical composition comprising a polymer, the polymer comprising a repeat unit corresponding to formula I, II, III, or IV

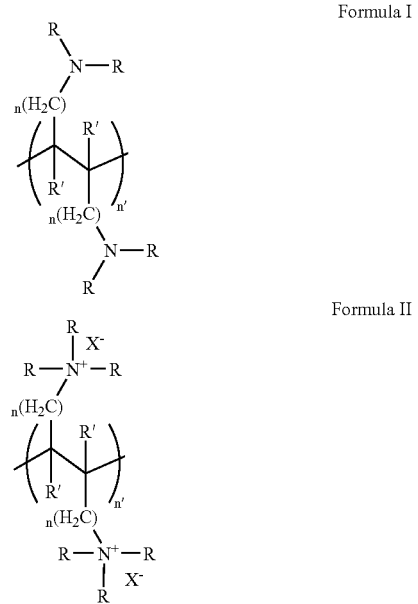

Formula I

Formula II

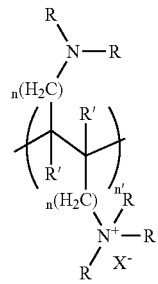

Formula III

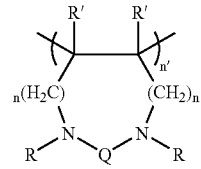

Formula IV or a copolymer thereof, wherein n is zero, one, or greater than 1, n' is greater than 2, each R is independently a suitable chemical group that complements the valency of nitrogen, each R' is independently H, alkyl, or amino, Q is a bond, alkyl, alkylamino, alkylcarbonyl, alkenyl, aryl, or heterocyclyl and $X^-$ is a negatively charged counterion and a pharmaceutically acceptable carrier.

2. The method of claim 1 wherein the pharmaceutical composition removes ions, small molecules or proteins from the gastrointestinal tract.

3. The method of claim 1, wherein the animal subject is suffering from a disease selected from the group consisting of hyperphosphatemia, hypocalcemia, hyperparathyroidism, depressed renal synthesis of calcitriol, tetany due to hypocalcemia, renal insufficiency, ecotopic calcification in soft tissues, and end stage renal disease (ESRD).

4. A method of removing phosphate from an animal subject comprising administering to an animal subject in need thereof an effective amount of the pharmaceutical composition comprising a polymer, the polymer comprising a repeat unit corresponding to formula I, II, III, or IV

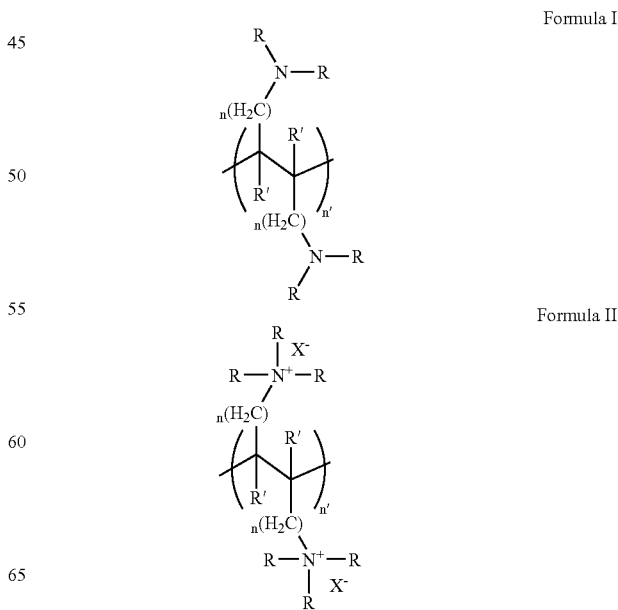

Formula I

Formula II

Formula III

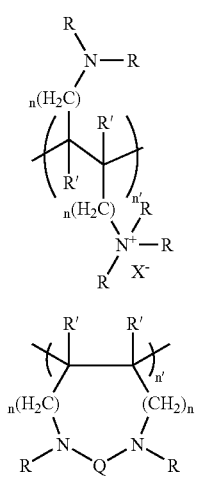

Formula IV

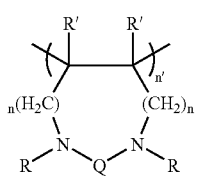

or a copolymer thereof, wherein n is zero, one, or greater than 1, n' is greater than 2, each R is independently a suitable chemical group that complements the valency of nitrogen, each R' is independently H, alkyl, or amino, Q is a bond, alkyl, alkylamino, alkylcarbonyl, alkenyl, aryl, or heterocyclyl and $X^-$ is a negatively charged counterion and a pharmaceutically acceptable carrier.

5. The method of claim 4 wherein the animal subject is suffering from a disease selected from the group consisting of hyperphosphatemia, hypocalcemia, hyperparathyroidism, depressed renal synthesis of calcitriol, tetany due to hypocalcemia, renal insufficiency, ecotopic calcification in soft tissues, and end stage renal disease (ESRD).

6. A method of removing oxalate from an animal subject comprising administering to an animal subject in need thereof an effective amount of the pharmaceutical composition comprising a polymer, the polymer comprising a repeat unit corresponding to formula I, II, III, or IV Formula I Formula II Formula III

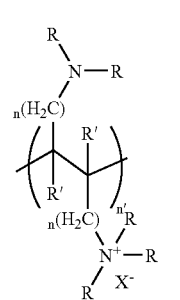

Formula IV

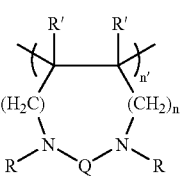

or a copolymer thereof, wherein n is zero, one, or greater than 1, n' is greater than 2, each R is independently a suitable chemical group that complements the valency of nitrogen, each R' is independently H, alkyl, or amino, Q is a bond, alkyl, alkylamino, alkylcarbonyl, alkenyl, aryl, or heterocyclyl and $X^-$ is a negatively charged counterion and a pharmaceutically acceptable carrier.

7. The method of claim 6 wherein the animal subject is suffering from a disease selected from the group consisting of kidney stones, hyperoxaluria and oxalosis.

8. A method of removing bile acids from an animal subject comprising administering to an animal subject in need thereof an effective amount of the pharmaceutical composition comprising a polymer, the polymer comprising a repeat unit corresponding to formula I, II, III, or IV Formula I Formula II Formula III

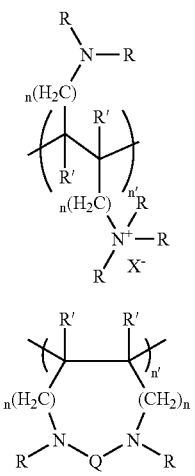

Formula IV

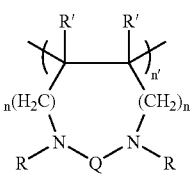

or a copolymer thereof, wherein n is zero, one, or greater than 1, n' is greater than 2, each R is independently a suitable chemical group that complements the valency of nitrogen, each R' is independently H, alkyl, or amino, Q is a bond, alkyl, alkylamino, alkylcarbonyl, alkenyl, aryl, or heterocyclyl and $X^-$ is a negatively charged counterion and a pharmaceutically acceptable carrier.

9. The method of claim 8, wherein the animal subject is suffering from a disease selected from the group consisting of hyperlipidemia and hypercholesteremia.

10. A method of removing metallic iron from an animal subject comprising administering to an animal subject in need thereof an effective amount of the pharmaceutical composition comprising a polymer, the polymer comprising a repeat unit corresponding to formula I, II, III, or IV Formula I

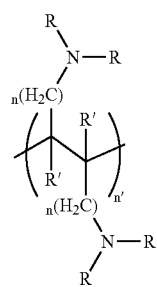

Formula II

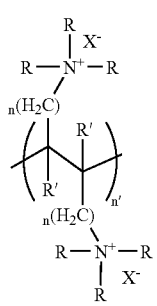

Formula III

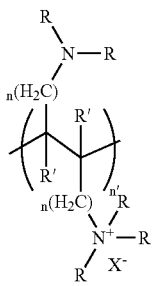

Formula IV

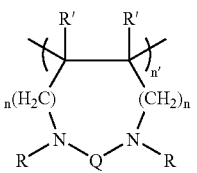

or a copolymer thereof, wherein n is zero, one, or greater than 1, n' is greater than 2, each R is independently a suitable chemical group that complements the valency of nitrogen, each R' is independently H, alkyl, or amino, Q is a bond, alkyl, alkylamino, alkylcarbonyl, alkenyl, aryl, or heterocyclyl and $X^-$ is a negatively charged counterion and a pharmaceutically acceptable carrier.

11. A method of removing chloride from an animal subject comprising administering to an animal subject in need thereof an effective amount of the pharmaceutical composition comprising a polymer, the polymer comprising a repeat unit corresponding to formula I, II, III, or IV Formula I

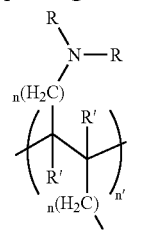

Formula II

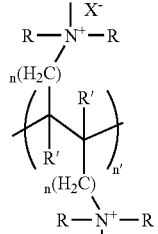

Formula III

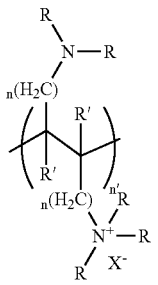

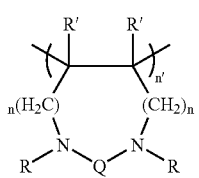

Formula IV or a copolymer thereof, wherein n is zero, one, or greater than 1, n' is greater than 2, each R is independently a suitable chemical group that complements the valency of nitrogen, each R' is independently H, alkyl, or amino, Q is a bond, alkyl, alkylamino, alkylcarbonyl, alkenyl, aryl, or heterocyclyl and $X^-$ is a negatively charged counterion and a pharmaceutically acceptable carrier.

12. The method of claim 11 wherein the animal subject is suffering from acidosis, heartburn, acid reflux disease, sour stomach, or gastritis.

13. The method of claim 1, 4, 6, 8, 10, or 11 wherein the animal subject is a human.

14. The method of claim 1 wherein when n equals 0 the polymer is crosslinked.

15. The method of claim 1 wherein n is one or greater.

16. The method of claim 1 wherein the polymer is a crosslinked polymer.

17. The method of claims 1, 4, 6, 8, 10, or 11 wherein the polymer or copolymer ha a size from about 500 to about 1,000,000 Dalton.

* * * * *